US006798899B2

(12) United States Patent
Mennie et al.

(10) Patent No.: US 6,798,899 B2
(45) Date of Patent: Sep. 28, 2004

(54) DOCUMENT FEEDING METHOD AND APPARATUS

(75) Inventors: Douglas U. Mennie, Barrington, IL (US); Heinz W. Schreiter, Plainfield, IL (US); Matthew L. Anderson, Salem, WI (US)

(73) Assignee: Cummins-Allison Corp., Mt. Prospect, IL (US)

( * ) Notice: Subject to any disclaimer, the term of this patent is extended or adjusted under 35 U.S.C. 154(b) by 749 days.

(21) Appl. No.: 09/754,511

(22) Filed: Jan. 4, 2001

(65) Prior Publication Data

US 2002/0085245 A1 Jul. 4, 2002

(51) Int. Cl.[7] .................................................. G06K 9/00

(52) U.S. Cl. ................. 382/135; 271/10.09; 271/10.11; 271/119; 271/120; 194/238; 194/291

(58) Field of Search ................................ 382/135, 318, 382/319, 320; 271/109, 116, 117, 119, 121, 122, 125, 187, 188, 209, 213, 3.05, 3.06, 3.07, 10.09, 10.11, 112, 120; 194/206, 207, 208, 213, 238, 291, 294

(56) References Cited

U.S. PATENT DOCUMENTS

| | | | | |
|---|---|---|---|---|
| 1,291,074 A | 1/1919 | Milmoe et al. | ............. | 271/119 |
| 1,919,238 A | 7/1933 | McCarthy | ................... | 271/119 |

(List continued on next page.)

FOREIGN PATENT DOCUMENTS

| | | | |
|---|---|---|---|
| DE | 2908058 | 9/1979 | ................. 271/119 |
| EP | A0338123 | 10/1989 | |
| EP | A0409203 | 1/1991 | |
| EP | 0 704 396 | 4/1996 | |
| EP | 0 815 046 B1 | 6/2001 | |
| EP | 0 735 513 B1 | 9/2001 | |
| EP | 0 865 398 B1 | 10/2001 | |
| EP | 0 946 402 B1 | 11/2001 | |
| GB | 2 198 122 A | 6/1988 | |
| JP | 282032 | 11/1988 | |
| JP | 177188 | 7/1989 | |
| JP | 198929 | 8/1990 | |
| WO | WO 91/11778 | 8/1991 | |
| WO | WO 93/23824 | 11/1993 | |

OTHER PUBLICATIONS

Abstract; EP 0 865 398 (DE 19543634 A) (English translation); 1 pg.
Abstract; EP 0 946 402 B1 (DE 19653424 A) (English translation); 1 pg.
PCT International Search Report for International Application No. PCT/US01/48415, filed Dec. 14, 2001; dated Feb. 11, 2003 (4 pages).
Mosler Inc. Brochure "The Mosler/Toshiba CF–420," 1989.
JetScan Currency Scanner/Counter, Model 4060, Operator's Manual by Cummins–Allison (8/91).
Sale of JetScan Currency Scanner/Counter, Model 4060 (8/91).
JetScan Currency Scanner/Counter, Model 4061, Operating Instructions by Cummins–Allison (Apr. 20, 1993).

(List continued on next page.)

*Primary Examiner*—Bhavesh M. Mehta
*Assistant Examiner*—Abolfazl Tabatabai
(74) *Attorney, Agent, or Firm*—Jenkens & Gilchrist

(57) ABSTRACT

A document feeding apparatus for use with a document processing device. The document feeding apparatus comprises an input receptacle adapted to receive a stack of documents and at least one feeding wheel adapted to strip documents, one at a time, from the stack of documents. The feeding wheel includes a moveable insert having a high friction surface adapted to engage and to advance each of the documents.

48 Claims, 13 Drawing Sheets

U.S. PATENT DOCUMENTS

| | | | | | |
|---|---|---|---|---|---|
| 2,214,752 | A | | 9/1940 | Pierce | 271/122 X |
| 2,455,836 | A | | 12/1948 | Van Brummelen | 271/1 |
| 3,044,770 | A | | 7/1962 | Breuers | 271/122 |
| 3,280,974 | A | | 10/1966 | Riddle et al. | 209/111.8 |
| 3,661,452 | A | * | 5/1972 | Hewes et al. | 399/195 |
| 3,771,783 | A | | 11/1973 | McInery | 271/125 |
| 3,870,868 | A | | 3/1975 | Jones | 235/92 SB |
| 3,908,982 | A | | 9/1975 | Abe | 271/21 |
| 3,952,183 | A | | 4/1976 | Abe | 235/92 SB |
| 3,976,198 | A | | 8/1976 | Carnes et al. | 209/117.7 T |
| 4,072,854 | A | | 2/1978 | Ohsima et al. | |
| 4,114,804 | A | | 9/1978 | Jones et al. | 235/476 |
| 4,126,305 | A | | 11/1978 | Colglazier et al. | 271/120 |
| 4,249,552 | A | * | 2/1981 | Margolin et al. | 194/207 |
| 4,250,806 | A | | 2/1981 | Boyson et al. | |
| 4,310,885 | A | * | 1/1982 | Azcua et al. | 705/16 |
| 4,313,598 | A | | 2/1982 | DiBlasio | 271/124 |
| 4,334,619 | A | | 6/1982 | Horino et al. | 209/551 |
| 4,352,988 | A | | 10/1982 | Ishida | 250/559 |
| 4,381,447 | A | | 4/1983 | Horvath et al. | 250/223 |
| 4,434,359 | A | | 2/1984 | Watanabe | |
| 4,443,006 | A | | 4/1984 | Hasegawa | 271/119 |
| 4,587,412 | A | | 5/1986 | Apisdorf | 235/449 |
| 4,653,647 | A | | 3/1987 | Hashimoto | 209/534 |
| 4,677,682 | A | | 6/1987 | Miyagawa et al. | 382/7 |
| 4,700,368 | A | | 10/1987 | Munn et al. | 377/8 |
| 4,709,911 | A | | 12/1987 | Saiki et al. | 271/122 |
| 4,715,597 | A | | 12/1987 | Sakurai | 271/122 |
| 4,768,068 | A | * | 8/1988 | Partilla | 355/75 |
| 4,801,134 | A | | 1/1989 | Yokoyama et al. | 271/122 |
| 4,827,531 | A | | 5/1989 | Milford | 392/7 |
| 4,861,013 | A | | 8/1989 | Shibata et al. | 271/122 X |
| 4,869,490 | A | | 9/1989 | Reid | 271/122 |
| 4,991,833 | A | | 2/1991 | Minami et al. | 271/277 |
| 4,996,604 | A | | 2/1991 | Ogawa et al. | 358/486 |
| 5,163,672 | A | | 11/1992 | Mennie | 271/187 |
| 5,183,142 | A | | 2/1993 | Latchinian et al. | |
| 5,207,788 | A | | 5/1993 | Geib et al. | 271/122 |
| 5,295,196 | A | | 3/1994 | Raterman et al. | 382/7 |
| 5,430,664 | A | | 7/1995 | Cargill et al. | 364/550 |
| 5,449,161 | A | | 9/1995 | Gysling | 271/119 |
| 5,467,406 | A | | 11/1995 | Graves et al. | 382/135 |
| 5,687,963 | A | | 11/1997 | Mennie | 271/19 |
| 5,692,067 | A | * | 11/1997 | Raterman et al. | 382/135 |
| 5,803,446 | A | | 9/1998 | Leuthold et al. | 271/9.08 |
| 5,815,592 | A | | 9/1998 | Mennie et al. | 382/135 |
| 6,182,962 | B1 | | 2/2001 | Leuthold | |
| 6,224,049 | B1 | | 5/2001 | Hosking et al. | 271/10.03 |
| 6,227,446 | B1 | * | 5/2001 | Haney et al. | 235/379 |
| 6,267,372 | B1 | | 7/2001 | Mylaeus et al. | |
| 6,439,395 | B1 | | 8/2002 | Voellmer et al. | 209/534 |
| 6,439,564 | B2 | | 8/2002 | Andersson et al. | 271/10.03 |

OTHER PUBLICATIONS

Sale of JetScan Currency Scanner/Counter, Model 4061 (Apr. 20, 1993).

JetScan Currency Scanner/Counter, Model 4062, Operating Instructions by Cummins–Allison (Nov. 28, 1994).

Sale of JetScan Currency Scanner/Counter, Model 4062 (Nov. 28, 1994).

AFB Currency Recognition System (1982).

Abstract of Japanese Patent Publication No. 63282032, dated Nov. 1988.

Abstract of Japanese Patent Publication No. 1177188, dated Jul. 1989.

Abstract of Japanese Patent Publication No. 2198929, dated Aug. 1990.

* cited by examiner

DOCUMENT FEEDING METHOD AND APPARATUS

FIELD OF THE INVENTION

The present invention relates generally to the field of document handling systems and, more particularly, to a paper currency feeding method and apparatus for use with a paper currency handling system.

BACKGROUND OF THE INVENTION

A variety of techniques and apparatuses have been used to satisfy the requirements of automated currency handling systems. As businesses and banks grow, these businesses are experiencing a greater volume of paper currency. Consequently, these businesses are continually requiring that their currency be processed in a more timely and efficient manner.

One drawback of currency handling machines that process stacks of currency bills is the unreliability associated with striping individual bills from a stack of bills and feeding the stripped bills into the currency processing machine. Specifically, often multiple bills are stripped and feed into the machine at the same time. This situation often translates into the reprocessing of an entire stack of bills so that an accurate count of the bills can be made. Reprocessing stacks of bills adds to the overall time required to process a batch of currency. Accordingly, there is a need for a feeding mechanism which can more reliably strip bills from a stack of bills and advance the stripped bills into a currency handling machine.

SUMMARY OF THE INVENTION

A document feeding apparatus for use with a document processing device. The document feeding apparatus comprises an input receptacle adapted to receive a stack of documents and at least one feeding wheel adapted to strip documents, one at a time, from the stack of documents. The feeding wheel includes a moveable insert having a high friction surface adapted to engage and to advance each of the documents.

The above summary of the present invention is not intended to represent each embodiment, or every aspect, of the present invention. Additional features and benefits of the present invention will become apparent from the detailed description, figures, and claims set forth below.

BRIEF DESCRIPTION OF THE DRAWINGS

Other objects and advantages of the invention will become apparent upon reading the following detailed description in conjunction with the drawings in which.

DETAILED DESCRIPTION OF THE ILLUSTRATED EMBODIMENTS

Figure 1:
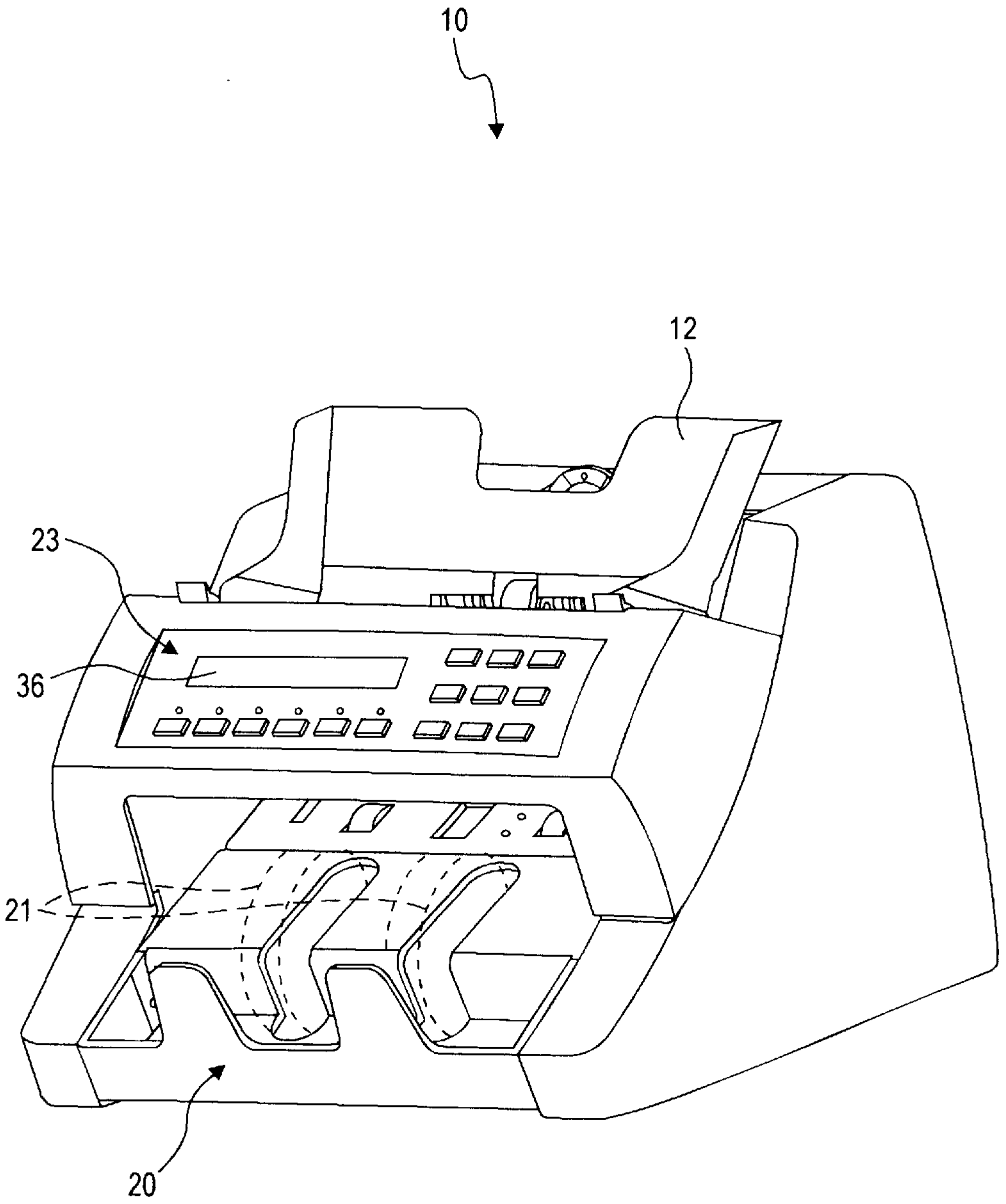
FIG. 1 is a perspective view of a currency processing machine for use with the present invention.
Figure 2:
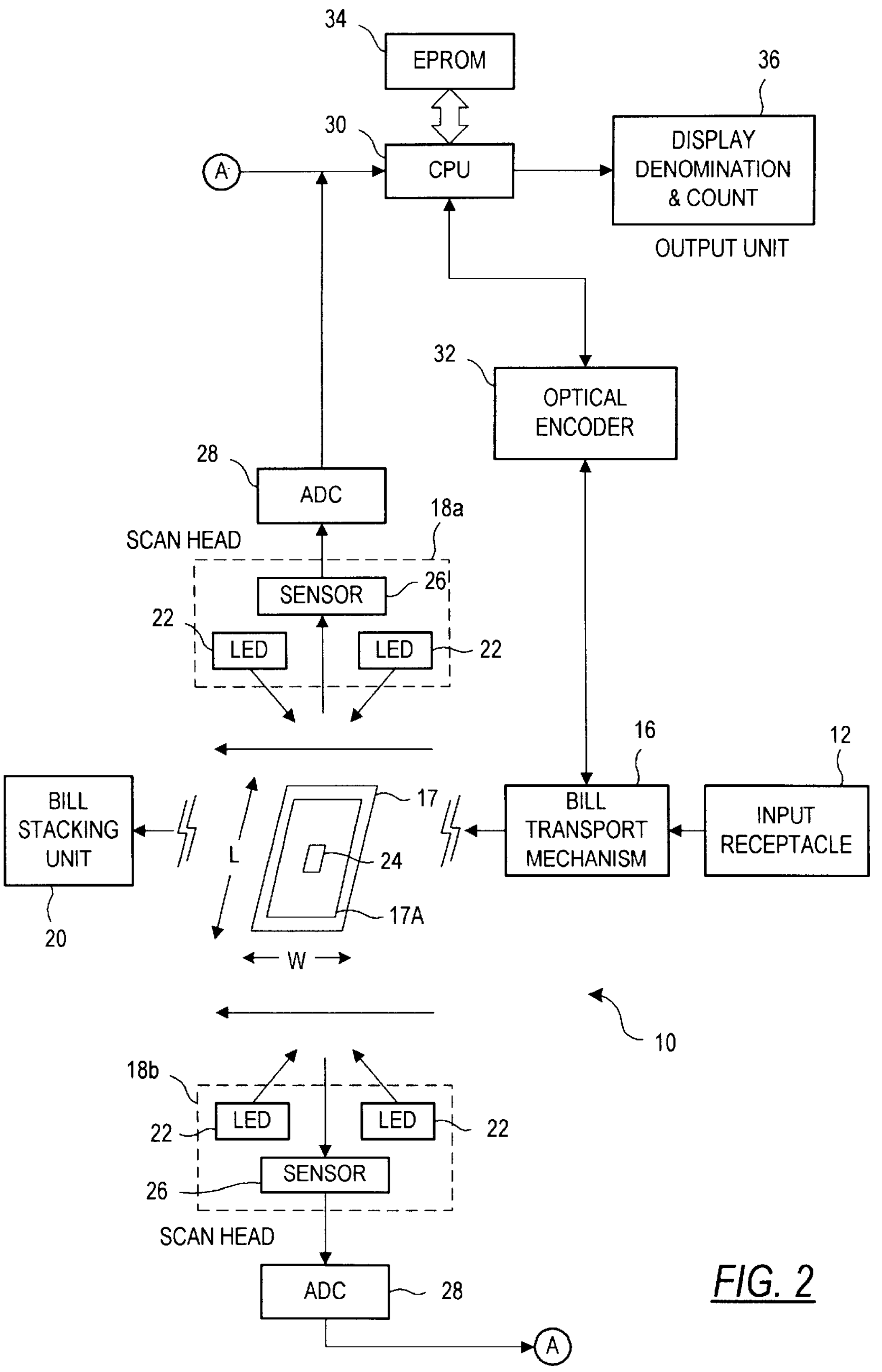
FIG. 2 is a functional block diagram of the currency processing machine of FIG. 1.

Referring now to FIGS. 1 and 2, there is shown a currency processing machine 10. The machine 10 includes an input receptacle 12 where stacks of currency bills that need to be identified and counted are positioned. Bills in the input receptacle 12 are picked out or separated, one bill at a time, and sequentially relayed by a bill transport mechanism 16, between a pair of scanheads 18*a* and 18*b* where, for example, the currency denomination of the bill is scanned and identified. In the embodiment depicted, each scanhead 18*a,b* is an optical scanhead that scans for characteristic information from a scanned bill 17 which is used to identify the denomination of the bill. The scanned bill 17 is then transported to an output receptacle 20, which may include a pair of stacking wheels 21, where bills so processed are stacked for subsequent removal. In alternative embodiments of the present invention, the machine 10 may include a plurality of output receptacles such as described in U.S. Pat. No. 6,311,819, entitled "Method and Apparatus For Document Processing," which is incorporated herein by reference in its entirety. For example, the present invention may be employed in a machine having two, four, or six output receptacles. The machine 10 includes a user interface 23 with a display 36 for communicating with a user of the machine 10.

In alternative embodiments of the present invention, additional sensors can replace or be used in conjunction with the optical scanheads 18*a,b* in the currency processing machine 10 to analyze, authenticate, denominate, count, and/or otherwise process currency bills. For example, size detection sensors, magnetic sensors, thread sensors, and/or ultraviolet/fluorescent light sensors may be used in the currency processing machine 10 to evaluate currency bills. The use of these types of sensors for currency evaluation are described in U.S. Pat. No. 6,278,795 entitled "Multi-Pocket Currency Discriminator," which is incorporated herein by reference in its entirety.

According to one embodiment of the currency processing machine 10, each optical scanhead 18*a,b* comprises a pair of light sources 22 directing light onto the bill transport path so as to illuminate a substantially rectangular light strip 24 upon a currency bill 17 positioned on the transport path adjacent the scanhead 18. Light reflected off the illuminated strip 24 is sensed by a photodetector 26 positioned between the two light sources. The analog output of the photodetector 26 is converted into a digital signal by means of an analog-to-digital (ADC) convertor unit 28 whose output is fed as a digital input to a processor such as central processing unit (CPU) 30.

According to one embodiment, the bill transport path is defined in such a way that the transport mechanism 16 moves currency bills with the narrow dimension of the bills being parallel to the transport path and the scan direction As a bill 17 traverses the scanheads 18*a,b*, the light strip 24 effectively scans the bill across the narrow dimension of the bill. In the embodiment depicted, the transport path is so arranged that a currency bill 17 is scanned across a central section of the bill along its narrow dimension, as shown in FIG. 2. Each scanhead functions to detect light reflected from the bill as it moves across the illuminated light strip 24 and to provide an analog representation of the variation in reflected light, which, in turn, represents the variation in the dark and light content of the printed pattern or indicia on the surface of the bill. This variation in light reflected from the narrow dimension scanning of the bills serves as a measure for distinguishing, with a high degree of confidence, among a plurality of currency denominations which the system is programmed to handle.

Additional details of such a scanning apparatus and process are described in U.S. Pat. Nos. 5,295,196 and 5,815,592 each of which are incorporated herein by reference in their entirety. While the currency process machine 10 has been described as a machine capable of determining the denomination of processed bill, the present invention is also applicable to note counting devices. Note counting devices are disclosed in commonly owned U.S. Pat. Nos. 6,026,175 and 6,012,565 and in commonly owned, co-pending U.S. patent application Ser. No. 09/611,279, filed Jul. 6, 2000, each of which are incorporated herein by reference in their entireties. Further, the present invention is applicable to devices which feed currency bill as well as other documents such as, for example, checks, stock certificates, postage stamps, and casino script.

Figure 3:
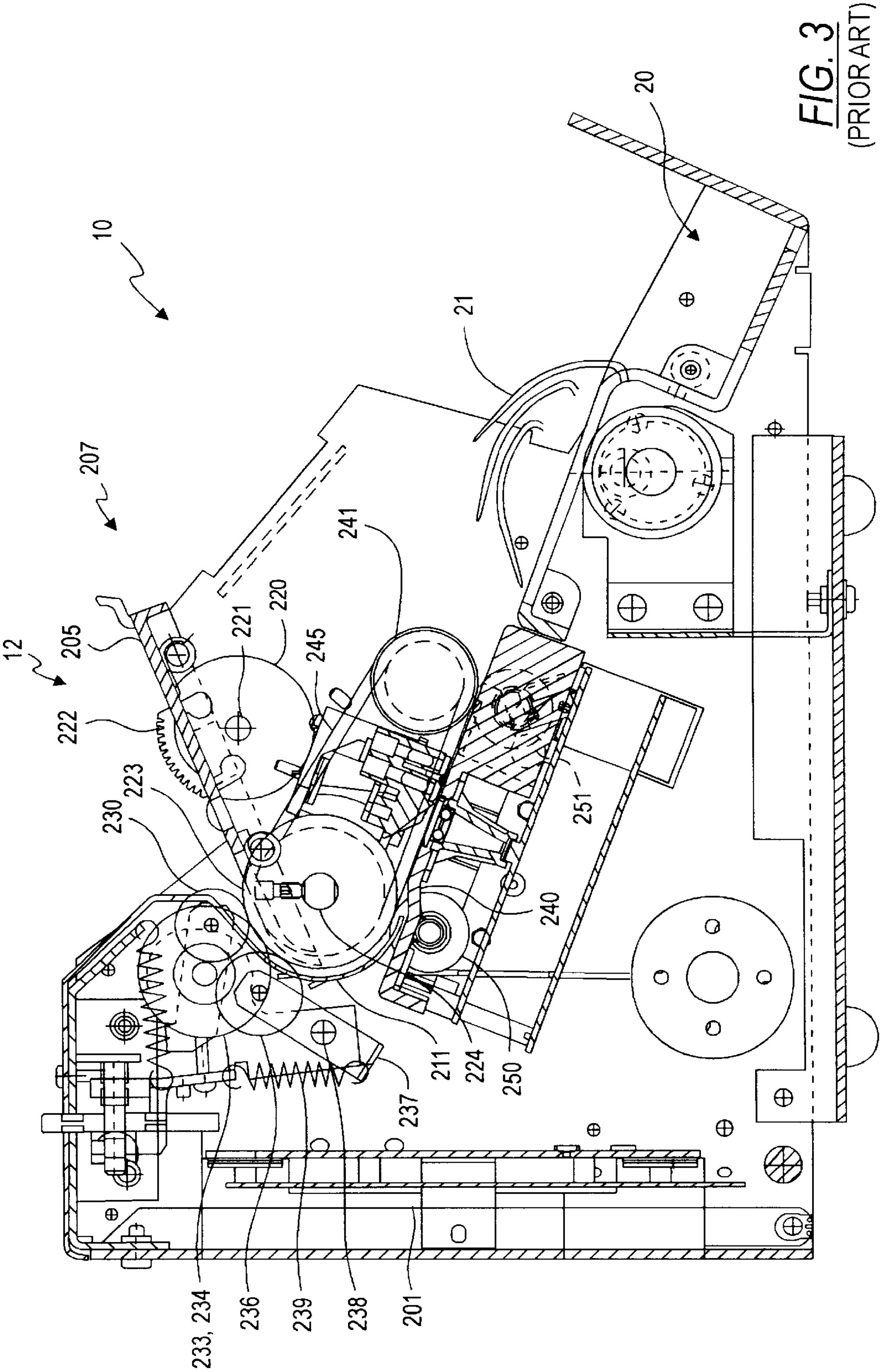
FIG. 3 (PRIOR ART)
FIG. 3 is an enlarged vertical section taken approximately through the center of a currency processing machine, but showing various transport rolls in side elevation, according to the prior art.
Figure 4:
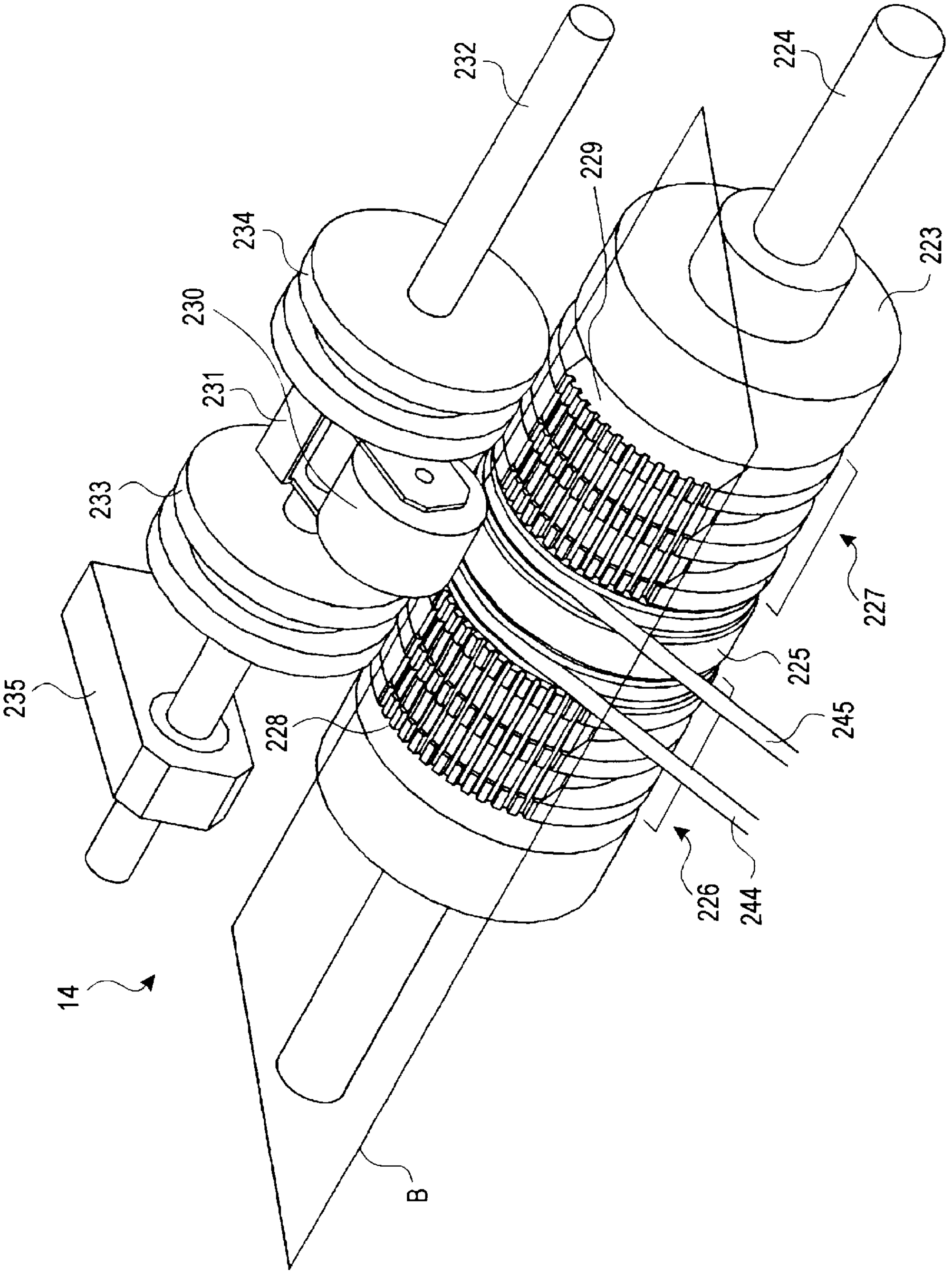
FIG. 4 (PRIOR ART)
FIG. 4 is an enlarged perspective view of various transport rolls of a transport mechanism for use with a currency processing machine according to the prior art.
Figure 5:
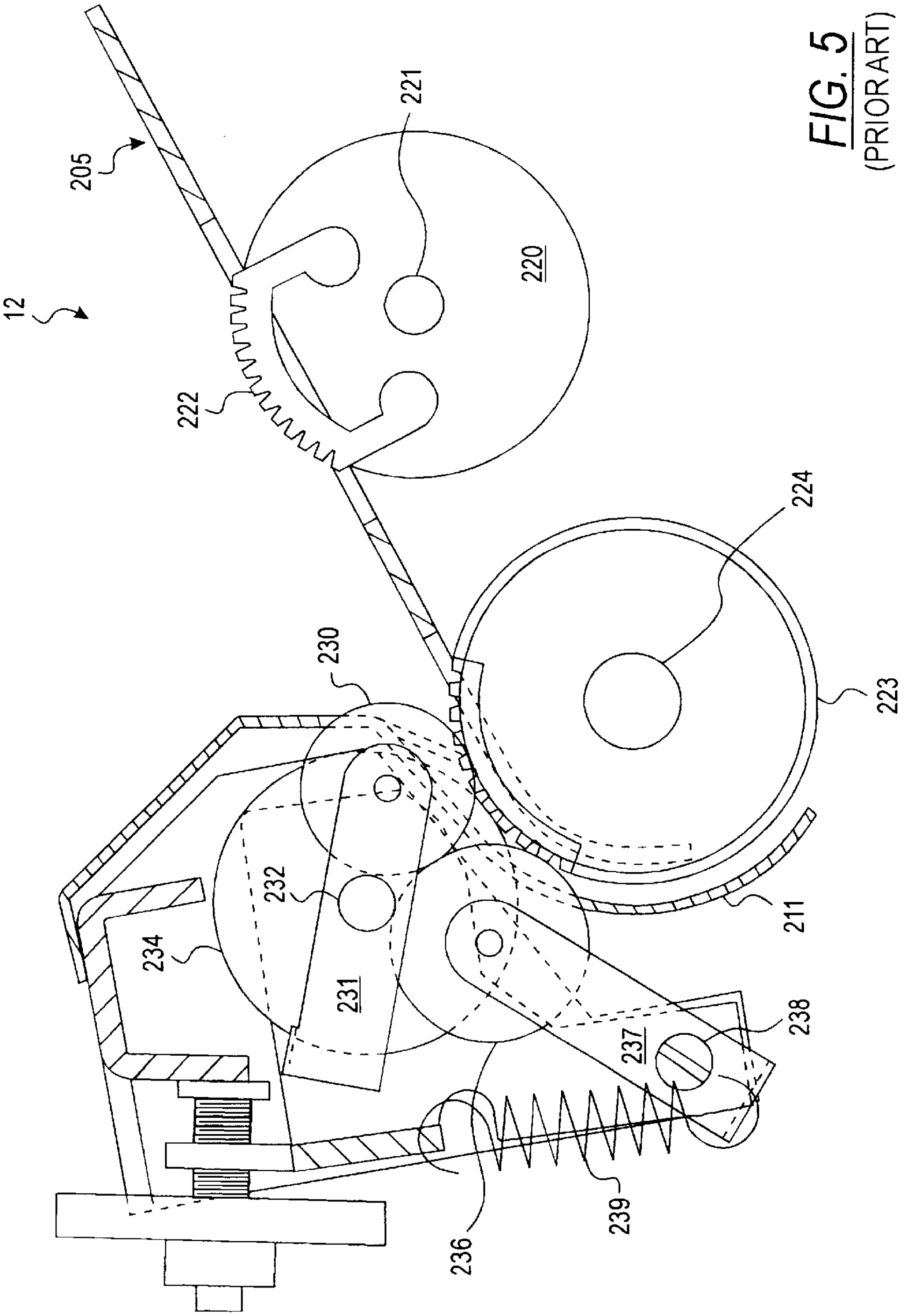
FIG. 5 (PRIOR ART)
FIG. 5 is a cross-sectional view of various transport rolls of a transport mechanism for use with a currency processing machine according to the prior art.

Referring now to FIGS. 3–5, a prior art bill separating mechanism for use with the currency processing machine 10 will be described. The bills stacked on a bottom wall 205 of the input receptacle 12 are stripped, one at a time, from the bottom of the stack. The bills are advanced by a pair of feeding wheels 220 mounted on a drive shaft 221. The feeding wheels 220 project through a pair of apertures or slots formed in the bottom wall 205. Part of the periphery of each wheel 220 is provided with a raised high-friction, serrated surface 222 which engages the bottom bill of the input stack as the wheels 220 rotate, to initiate feeding movement of the bottom bill from the stack. The serrated surfaces 222 project radially beyond the rest of the wheel 220 peripheries so that the wheels "jog" the bill stack during each revolution so as to agitate and loosen the bottom currency bill within the stack, thereby facilitating the feeding of the bottom bill from the stack.

The feeding wheels 220 feed each bill B (FIG. 4) onto a drive roll 223 mounted on a driven shaft 224 supported across the side walls of the machine 10. As can be seen most clearly in FIGS. 4 and 5, the drive roll 223 includes a central smooth friction surface 225 formed of a material such as rubber or hard plastic. This smooth friction surface 225 is sandwiched between a pair of grooved surfaces 226 and 227 having serrated portions 228 and 229 formed from a high-friction material.

The serrated surfaces 228, 229 engage each bill after it is fed onto the drive roll 223 by the feeding wheels 220, to frictionally advance a bill into the narrow acute passageway formed by the curved guideway 211 adjacent the rear side of the drive roll 223. The rotational movement of the drive roll 223 and the feeding wheels 220 is synchronized so that the serrated surfaces on the drive roll 223 and the feeding wheels 220 maintain a constant relationship to each other Moreover, the drive roll 223 is dimensioned so that the circumference of the outermost portions of the grooved surfaces is greater than the width W of a bill, so that the bills advanced by the drive roll 223 are spaced apart from each other. That is, each bill fed to the drive roll 223 is advanced by that roll only when the serrated surfaces 228, 229 come into engagement with the bill, so that the circumference of the drive roll 223 determines the spacing between the leading edges of successive bills.

In order to ensure firm engagement between the drive roll 223 and the currency bill being fed, an idler roll 230 urges each incoming bill against the smooth central surface 225 of the drive roll 223. The idler roll 230 is journalled on a pair of arms 231 which are pivotally mounted on a support shaft 232. Also mounted on the shaft 232, on opposite sides of the idler roll 230, are a pair of grooved retard rollers 233 and 234. The grooves in these two retard rollers 233, 234 are registered with the central ribs in the two grooved surfaces 226, 227 of the drive roll 223. The retard rollers 233, 234 are locked to the shaft 232, which in turn is locked against movement in the direction of the bill movement (clockwise as viewed in FIG. 3) by a one-way roller clutch 235. Each time a bill is fed into the nip between the retard rollers 233, 234 and the drive roll 223, the clutch 235 is energized to turn the shaft 232 just a few degrees in a direction opposite the direction of bill movement. These repeated incremental movements distribute the wear uniformly around the circumferences of the retard rollers 233, 234. The surface of each of the retard rollers 233, 234 has a coefficient of friction greater than that of a currency bill, but less than that of the inserts 228, 229 of the drive roll 223, for stripping the upper bill(s) from the bottom bill which is in contact with the drive roll 223 when multiple bills are advanced by the feeding wheels 220. Although the idler roll 230 and the guide wheels 233, 234 are mounted behind the guideway 211, the guideway is apertured to allow the roll 230 and the wheels 233, 234 to engage the bills on the front side of the guideway.

Beneath the idler roll 230, a spring-loaded pressure roll 236 (FIGS. 3 and 5) presses the bills into firm engagement with the smooth friction surface 225 of the drive roll as the bills curve downwardly along the guideway 211. This pressure roll 236 is journalled on a pair of arms 237 pivoted on a stationary shaft 238. A spring 239 attached to the lower ends of the arms 237 urges the roll 236 against the drive roll 233, through an aperture in the curved guideway 211.

At the lower end of the curved guideway 211, the bill being transported by the drive roll 223 engages a flat guide plate 240 (FIG. 3) which carries a lower scan head 18*b* (FIG. 2). Currency bills are positively driven along the flat plate 240 by means of a transport roll arrangement which includes the drive roll 223 at one end of the plate and a smaller driven roll 241 at the other end of the plate. Both the driver roll 223 and the smaller roll 241 include pairs of smooth raised cylindrical surfaces (not shown) which hold the bill flat against the plate 240. A pair of O rings 244, 245 (FIGS. 3 and 4) fit into grooves formed in both the roll 241 and the roll 223 to engage the bill continuously between the two rolls 223 and 241 to transport the bill while helping to hold the bill flat against the guide plate 240.

The flat guide plate 240 is provided with openings through which the raised surfaces of both the drive roll 223 and the smaller driven roll 241 are subjected to counter-rotating contact with corresponding pairs of passive transport rolls 250 and 251 having high-friction rubber surfaces. The passive rolls 250, 251 are mounted on the underside of the flat plate 240 in such a manner as to be freewheeling about their axes and biased into counter-rotating contact with the corresponding upper rolls 223 and 241 The passive rolls 250 and 251 are biased into contact with the driven rolls 223 and 241 by means of a pair of H-shaped leaf springs (not shown). Each of the four rolls 250, 251 is cradled between a pair of parallel arms of one of the H-shaped leaf springs. The central portion of each leaf spring is fastened to the plate 240, which is fastened rigidly to the machine frame, so that the relatively stiff arms of the H-shaped springs exert a constant biasing pressure against the rolls and push them against the upper rolls 223 and 241.

As bills are moved along the flat guide 240 plate, the bills are moved past sensors which scan the bills or otherwise sample or evaluate. Bills are then moved along the flat guide plate 240 to the stacker wheels 21 and are stacked in the output receptacle 20. Further details of the mechanical and operational aspects, including the scanning techniques, of various embodiments of a currency scanning and counting machine 10 are described in detail in commonly owned U.S. Pat. No. 5,815,592 entitled "Method And Apparatus For Discriminating And Counting Document" which is incorporated herein by reference in its entirety.

The present invention is directed towards a currency bill feeding mechanism which has been found to provide more reliable bill feeding results than that of the prior art. It has been found that prior art feeding mechanisms often unreliably feed bills in certain situations. "Unreliable feeding" refers to situations where multiple bills are fed, no bills are fed, or the bill feeding is not smooth.

The feeding of multiple bills sometimes occurs when larger stacks of bills are processed. The weight from a larger stack of bills increases the degree of friction between the bottom bill and the feeding wheels as well as the friction between adjacent bills near the bottom of the larger stack. When protruding inserts (e.g., inserts that extend beyond the periphery the feeding wheels), are brought into contact with a large stack of bills to advance the bottom bill, the increased degree of friction between adjacent bills at the bottom of the stack may result in the advancement of multiple bills. Without inserts that protrude beyond the periphery of the feeding wheels, however, it has been found that bills at the bottom of very small stacks of bill may not be properly advanced into the transport mechanism 16 because there is insufficient weight forcing the bottom bill in the small stack downward into engagement with the feeding wheel.

The aforementioned problems are mitigated by providing a radially floating insert which extends beyond the periphery of each wheel a variable distance D. Very generally, the radially floating inserts enable the pair of feeding wheels to operate as though the feeding wheels each include a protruding insert when the stack of bills is small and operate as though the feeding wheels each include an insert which is less protruding or "non-protruding" when the stack of bills is large. When the stack of bills is large the radially floating insert is held within the feeding wheel to reduce the occurrences of advancing multiple bills and when the stack of bills is small the radially floating insert is moved radially outward to engage the bottom bill in a stack of bill and to advance that bottom bill.

Figure 6A:
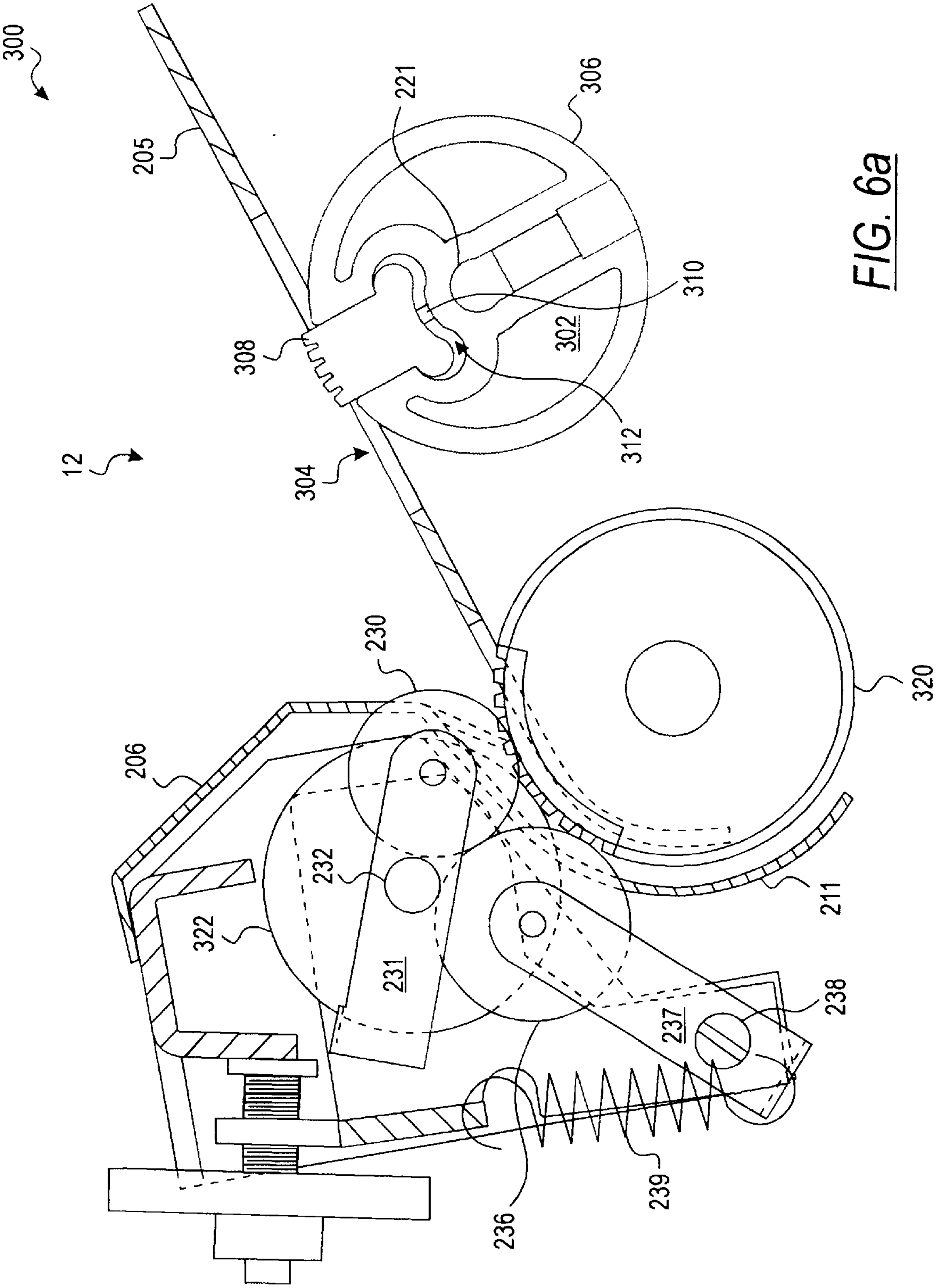
FIG. 6*a* is a cross-sectional view of various transport rolls of a bill separating mechanism and transport mechanism for use with a currency processing machine according to one embodiment of the present invention.
Figure 6B:
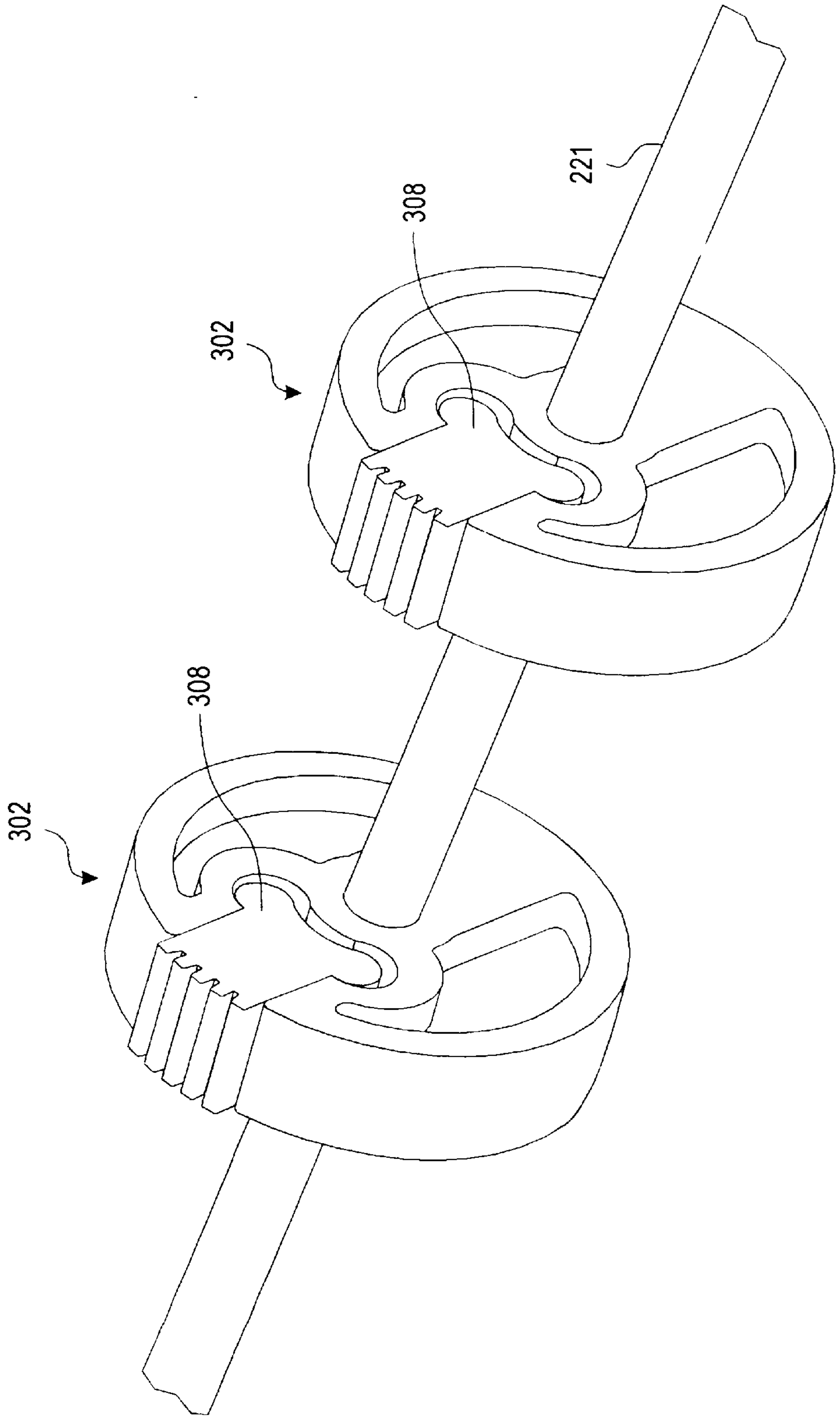
FIG. 6*b* is a perspective view of a pair of feeding wheels according to one embodiment of the present invention.

Referring now to FIGS. 6*a* and 6*b*, various transport rolls of a bill separating mechanism 300 and transport mechanism for use with a document or currency processing is shown. Bills stacked on the bottom wall 205 of the input receptacle 12 are advanced, one at a time, from the bottom of the stack. The bottom bill of the stack of bills is advanced by a pair of feeding wheels 302, mounted on a drive shaft 221. The feeding wheels 302 project through a pair of slits or apertures 304 formed in the bottom wall 205. While the separating mechanism 300 includes two feeding wheels 302 mounted on a common drive shaft 221, a single feeding wheel 302 will be discussed in order to simplify the following description of the operation of the feeding wheels 302. Each feeding wheel 302 is provided with a radially floating insert 308. The insert 308 slides along a post 310 disposed in a generally inverted "T" shaped aperture or slot 312 disposed within the feeding wheel 302. The post 310 extends radially outward within the slot 312 towards the outer periphery 306 of the wheels 302 In alternative embodiments of the feeding wheel 302, the radially floating insert is slideably engaged to a slot in the wheel and not a post. Like the insert 222 discussed in connection with FIGS. 3–5, the radially floating insert 306 includes a high-friction, serrated surface which engages the bottom bill of a stack of bills placed in the input receptacle 12 as the feeding wheel 302 rotates, to initiate feeding movement of the bottom bill from the stack. Each rotation of the feeding wheel 302 brings the insert 308 into contact with the bottom of the stack of bills to advance the bottom bill. In one embodiment, each feeding wheel 302 has a diameter of approximately 1.5 inches (about 3.81 cm).

Figure 7B:
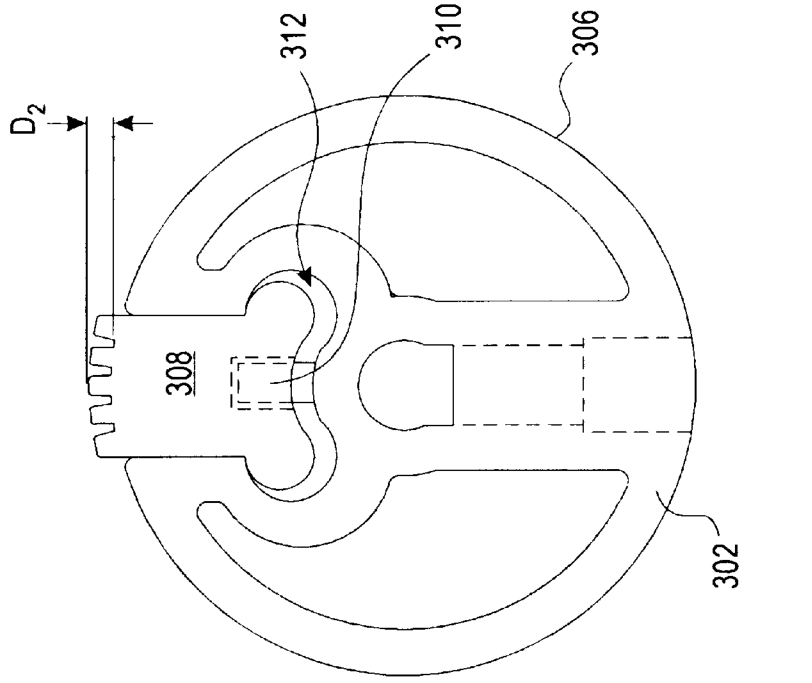
FIGS. 7*a* and 7*b* are side sectional views of a feeding wheel according to one embodiment of the present invention.
Figure 7A:
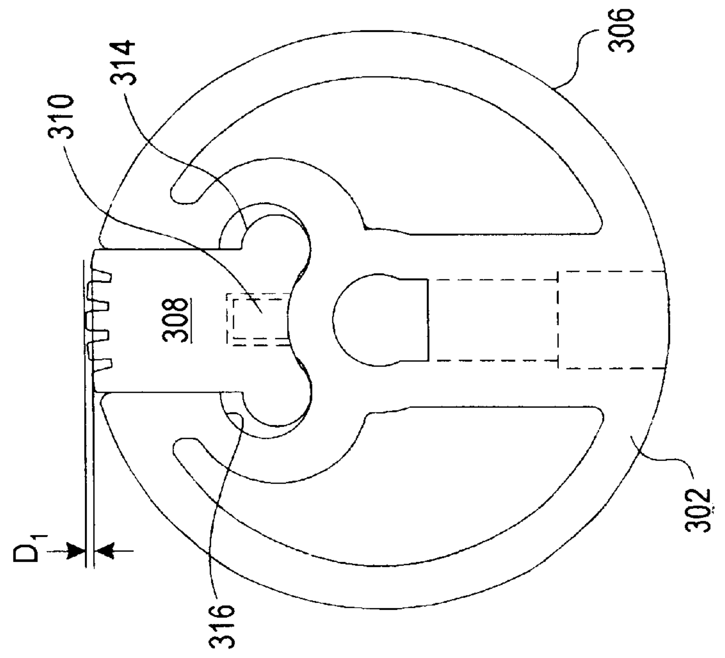

Referring now to FIGS. 7*a* and 7*b*, a feeding wheel 302 having a radially floating insert 308 is shown. In FIG. 7*a*, the radially floating insert 306 is shown in a "minimally extended" position such that the insert extends beyond the periphery of the feeding wheel 302 a minimum distance $D_1$. In alternative embodiments, the distance $D_1$ ranges between approximately zero inches (about zero cm) and approximately 0.050 inch (about 0.127 cm). In one embodiment of the present invention, the distance $D_1$ is about zero inches (about zero cm). The radially floating insert 302 is able to freely slide along a post 310 disposed within the slot 312 between the "minimally extended" position (FIG. 7*a*) and a fully extended position shown (FIG. 7*b*). In the fully extended position, the insert 308 extends a maximum distance $D_2$ beyond the periphery of the feeding wheel 302. In alternative embodiments, the distance $D_2$ ranges between approximately 0.020 inch (about 0.051 cm) and approximately 0.200 inch (about 0.508 cm). In one embodiment of the present invention, the distance $D_2$ is approximately 0.040 inch (about 0.102 cm). Further extension of the radially floating insert beyond the maximum distance $D_2$ is limited by flanges 314 of the insert 308 which engage walls 316 of the slot 312. In other alternative embodiments, the inset does not include flanges and the slot does not include walls 316 to limit further extension of the insert 308. Rather, in such embodiments, further extension of the radially floating insert 308 beyond the maximum distance $D_2$ is limited by a resilient member such as a spring, a small chain or cable, a wire, or a string. In an alternative embodiment of the present invention, the radially floating insert is biased towards the extended position by resilient member such as a spring.

As the feeding wheel 302 rotates, the rotational movement of the wheel 302 forces the insert 308 to slide radially outward along the post 310 into the extended position. As wheel 302 rotates, the insert 308 comes into contact with the bottom of a stack of bills. When the insert contacts a stack of bills, the weight of the bills may force the insert 308 radially inward. The extent to which the insert is forced radially inward depends upon the size/weight of the stack of bills as well as the rotational speed of the wheel 302. When the stack of bills is large, the weight of the stack of bills forces the insert to its "minimally extended" position as the insert contacts the stack of bills. When the stack of bills is small (and light), the weight of the stack of bills is insufficient to move the insert to its "minimally extended" position allowing the insert 308 to maintain its extension beyond the periphery 306 of the feeding wheel 302. Depending on the size/weight of the remaining stack of bills, the insert 308 may be forced radially inward by the stack of bills such that the insert 308 extends beyond the periphery 306 of the wheel 302 a distance less than $D_2$ but greater than $D_1$.

Each rotation of the feeding wheels 302 separates one bill from the stack of bills. Accordingly, when the currency handling machine 10 is processing bills at a rate of about 800 bills per minute, the feeding wheels 302 have a rotational speed of about 800 revolutions per minute. (In alternative embodiments, the machine 10 is capable of processing from about 800 to over 1500 bills per minute.) According to one embodiment of the present invention, each of the inserts 308 are made out of a urethane material. Each of the feeding wheels have a diameter of approximately 1.5 in (approximately 3.81 cm). The feeding wheels are made out of hard plastic such as Delrin®.

Figure 8B:
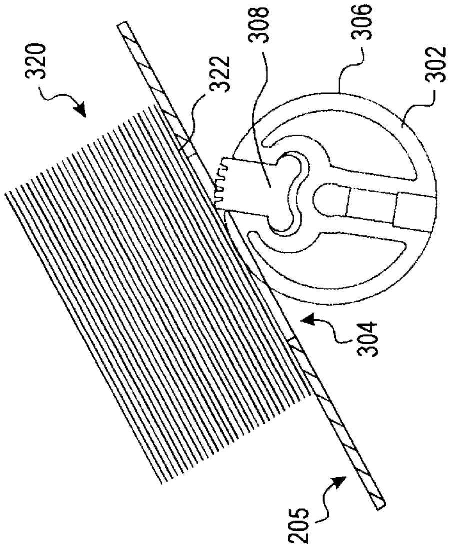
FIGS. 8*a–d* and 9*a–d* are side sectional views of a feeding wheel shown in various positions during the bill feeding process according to one embodiment of the present invention.
Figure 8D:
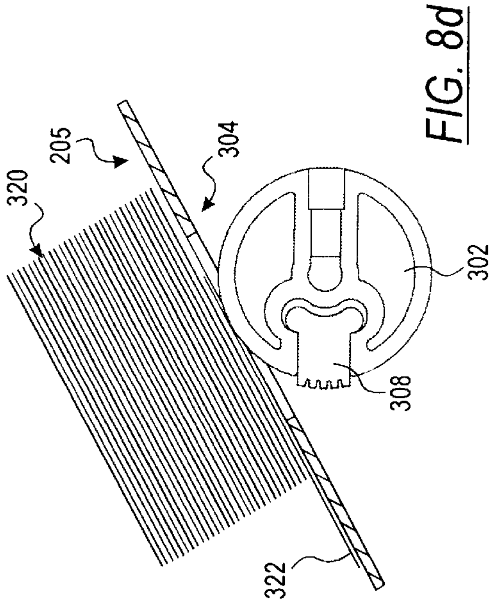
Figure 8A:
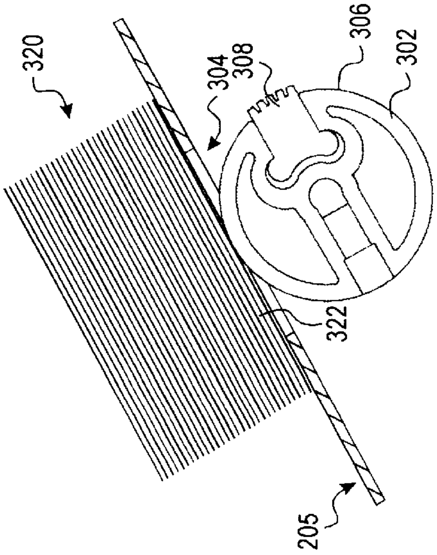
Figure 8C:
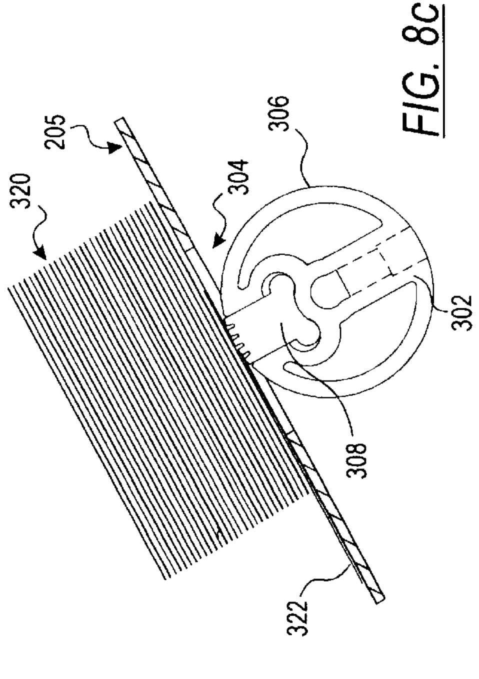

Referring now to FIGS. 8*a–d* and 9*a–d*, the operation of a feeding wheel 302 with radially floating inserts 308 will be described As the feeding wheel 302 rotates (counterclockwise as viewed in FIGS. 8*a–d* and 9*a–d*), bills are advanced, one at a time, toward a main feeding/drive roll 320 of the machine 10. In FIGS. 8*a–d*, a large stack of bills 320 are stacked upon the bottom wall 205. The rotational movement of the feeding wheel 302 creates a centrifugal force that forces the insert 308 to move radially outward such that the insert extends beyond the periphery 306 of the feeding wheel 302 (e.g., towards the fully extended position) as shown in FIG. 8*a*. As feeding wheel rotates, the insert 308 is brought into contact with the bottom bill 322 of the large stack of bills 320 as shown in FIG. 8*b*. As the wheel continues to rotate the insert 308 engages the bottom bill 322 and begins to advance the bill forward (to the left as viewed in FIGS. 8*a–d*). The weight of the large stack of bills 320 pushes the insert 308 radial inward back within the wheel 302 until the bottom of the insert 308 presses against the bottom of the slot as shown in FIG. 8*c* (e.g., the "minimally extended" position). The insert 308 rotates past the stack of bills 320 having advanced the bottom bill 322. Because the weight of the large stack of bills 322 is no longer acting on the insert 308, the insert 308 is free to slide radially outward as shown in FIG. 8*d* back into the fully extended position. This movement of the insert 308 is repeated for each revolution of the wheel 302 until the stack of bills is reduced in size wherein the weight of the smaller stack of bills is too small to press hold the insert back within the slot 312 of the wheel 302 toward its minimally extended position.

Figure 9B:
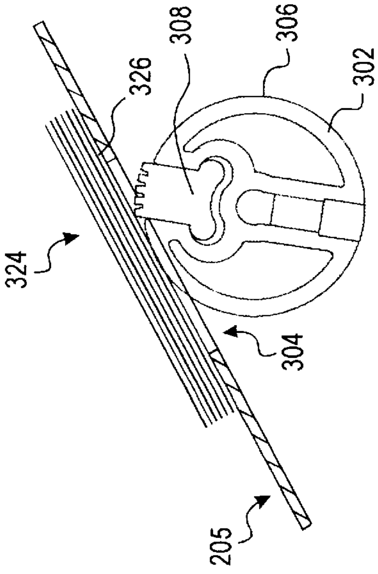
Figure 9D:
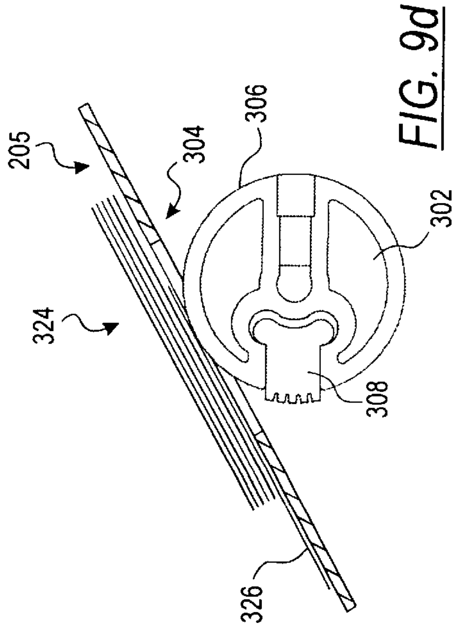
Figure 9A:
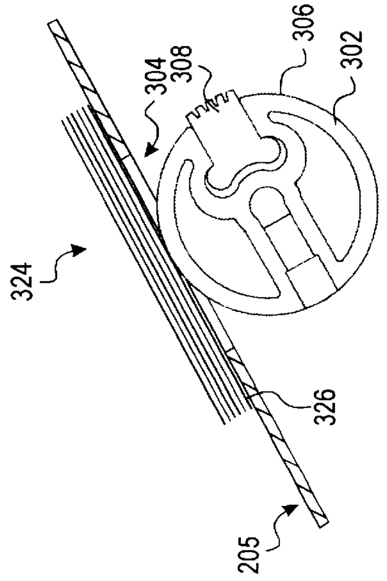
Figure 9C:
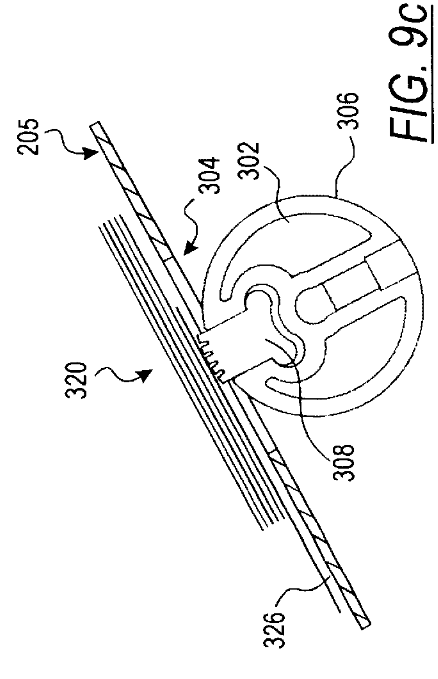
Figure 10:
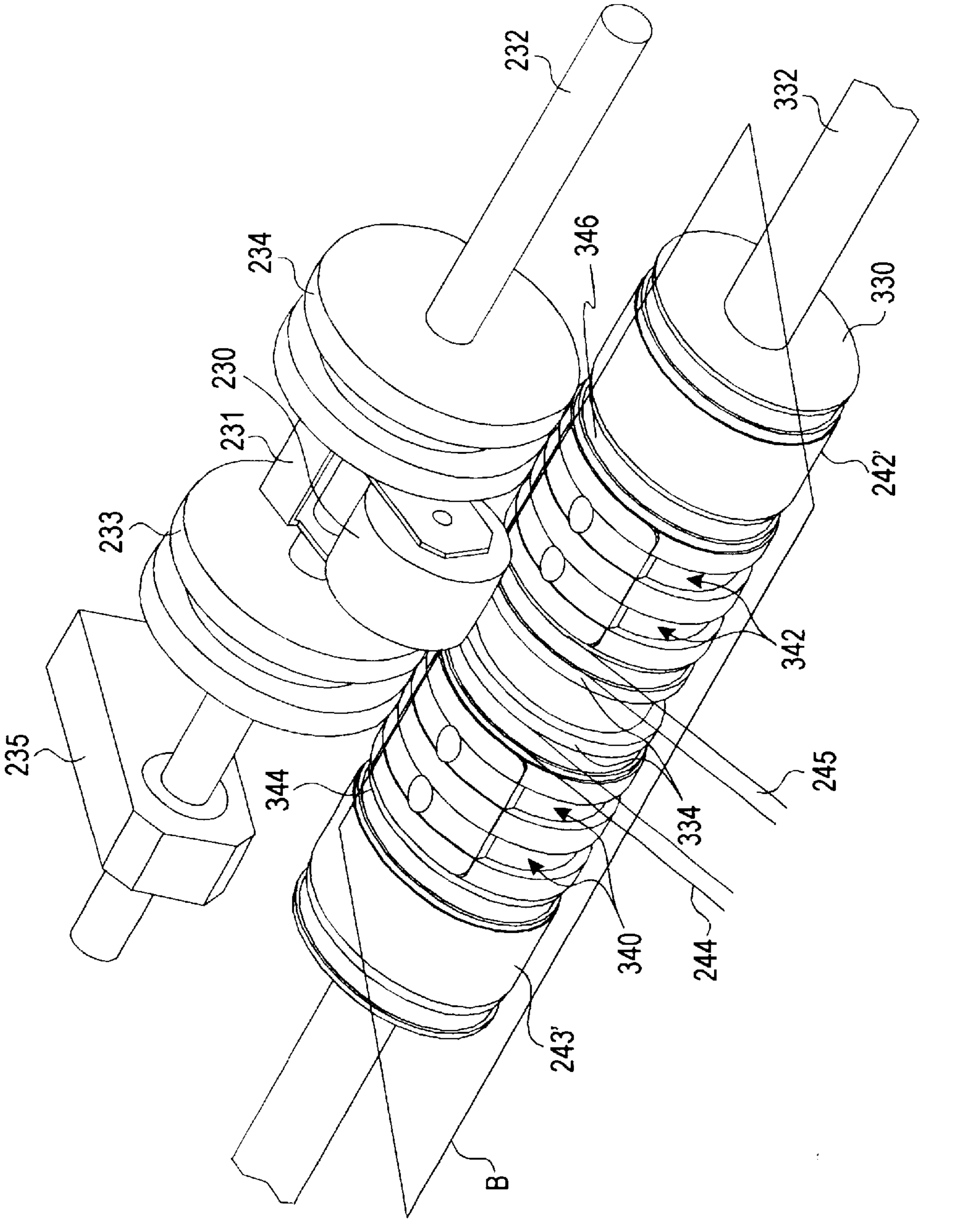
FIG. 10 is an enlarged perspective view of various transport rolls of a transport mechanism for use with a currency processing machine according to one embodiment of the present invention.
Figure 11:
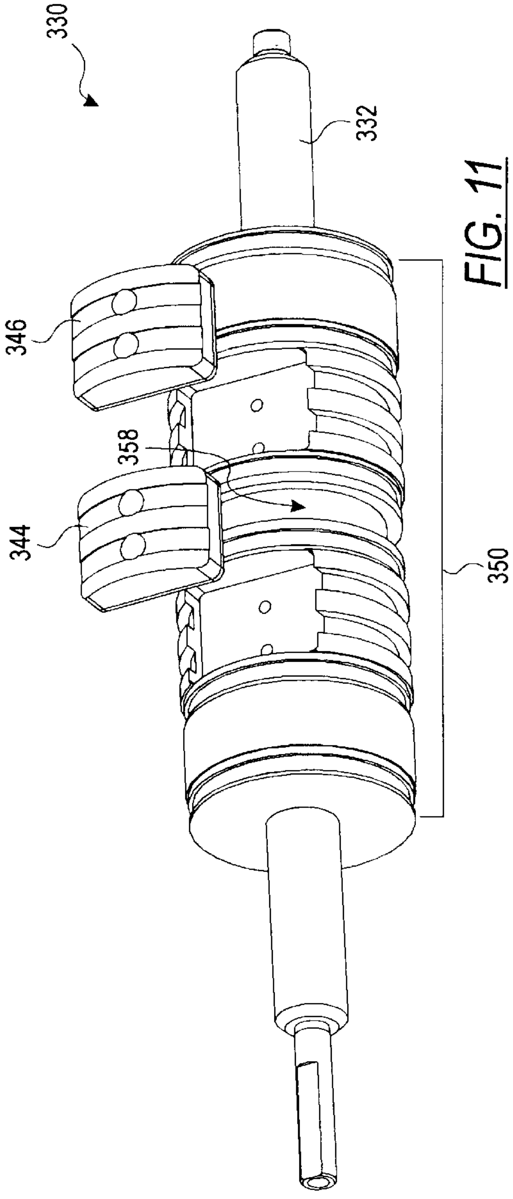
FIGS. 11 and 12 are a perspective views of a main drive roller according to one embodiment of the present invention.
Figure 12:
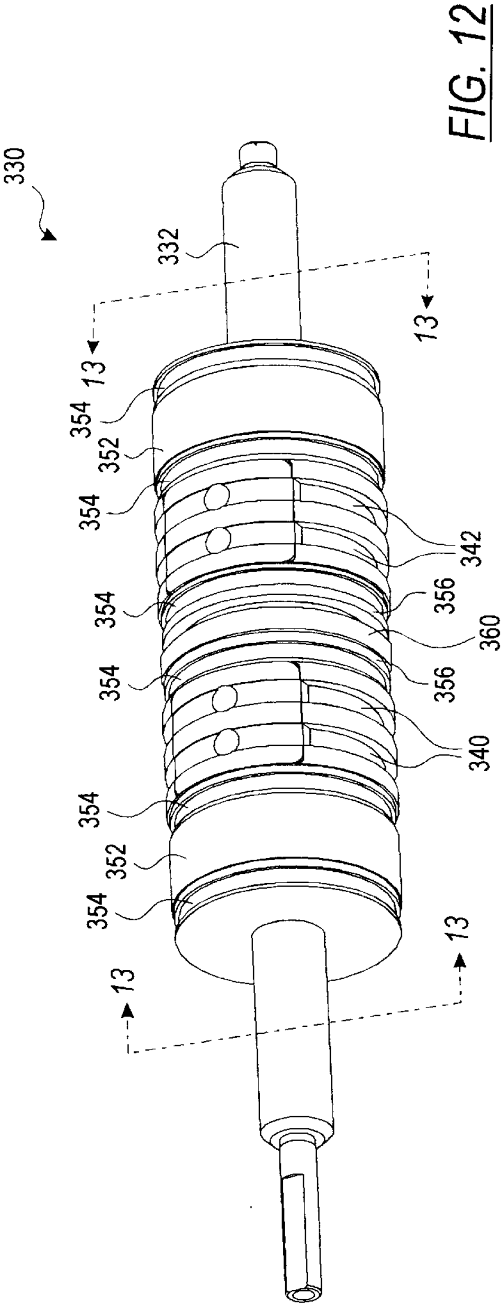
Figure 13:
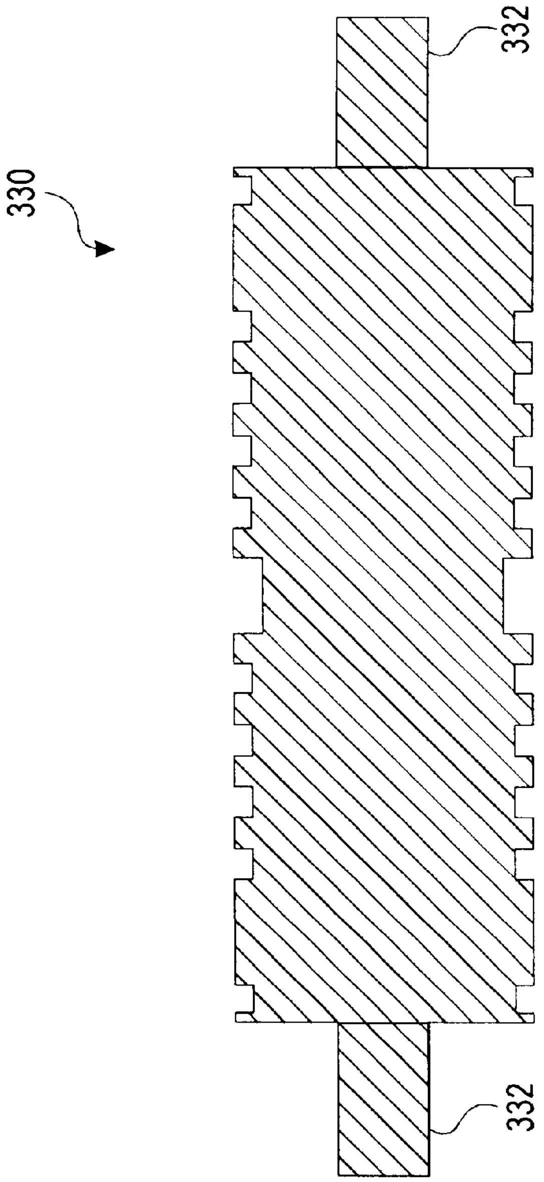
FIG. 13 is a cross-sectional view of the main drive roller depicted in FIG. 11 along line 13 according to one embodiment of the present invention.

In FIG. 9*a*, a small stack of bills 324 is shown resting upon the bottom wall 205. The rotational movement of the feeding wheel 302 forces the insert 308 to move radially outward such that the insert extends beyond the periphery 306 of the feeding wheel 302 (e.g., to the fully extended position) as shown in FIG. 9*a*. As the feeding wheel 302 rotates, the insert 308 is brought into contact with a bottom bill 326 of the stack of bills as shown in FIG. 9*b*. As the wheel continues to rotate the insert 308, still in the fully extended position, it "jogs" the stack of bills 324 and engages the bottom bill 326 and begins to advance the bottom bill 326 forward (to the left as viewed in FIGS. 9*a–d*). When the insert contacts the stack of bills, the stack of bills is forced upward resulting in more driving force on the bottom bill. This loosens the bottom bill. The weight of the small stack of bills 324 is insufficient to force the insert 308 radially inward back within the wheel 302 when the stack of bill is small. Therefore, in the example shown in FIGS. 9*a–d*, the insert 308 maintains its fully extended position throughout the revolution of the wheel 302. As the wheel 302 continues to rotate, the bottom bill 326 is pushed forward by the extended insert 308 as shown in FIG. 9*c* until the insert is rotated below the bottom wall 205.

Referring now to FIGS. 10–13, the feeding wheels 302 advance each stripped bill B into engagement with a main drive roller 330. According to the embodiment of FIGS. 10–12, an integrated main drive roll arrangement 330 is shown. According to one embodiment, the main drive roll arrangement 330 is fabricated from a single piece of material and comprises a drive shaft 332 and a wheel portion 350. The wheel portion includes outer roller portions 352, O-ring grooves 354 to accommodate O-rings such as O-rings 244, 245 (FIG. 4), walls 356 , and two pairs of shallow grooves 340 and 342 formed in the surface of the drive roller 330 which correspond to grooved retard rollers 233, 234. A space 358 disposed between walls 356 hold a rubber ringed called a "tire" 360 that along with the pressure roller 236, engage bills advanced by the bill separating mechanism 300. The pressure roller 236 presses each of the bills into firm engagement with the tire 360 disposed in the space 356 between walls 356. The outer roller portions 352 of the main drive roller 330 contact the idle rollers 250 to positively drive bills along the flat plate 240 (FIG. 3).

In one embodiment, the integrated drive roll 330 is machined out of a single piece of aluminum. Forming the drive roller 330 of out a single piece of material alleviates alignment issues associated with attaching components such as rollers 223 to the drive shaft 224 of FIG. 4. In order to process 800 bills per minute, the main drive roller 330 rotates on the order of approximately 800 revolutions per minute. (In alternative embodiments, the machine 10 is capable of processing from about 800 to over 1500 bills per minute.) Because the main drive roller 330 rotates at such high speeds, a high degree of precision is required during the alignment of the components associated with the dive roller. Integrating the rollers 223 and the drive shaft 332 eliminates the step of aligning these two components during the manufacturing process which in turn reduces the maintenance requirements of the machine 10.

The drive roller 330 illustrated in FIGS. 10–13 operates in a manner similar to the prior art arrangement in illustrated in FIG. 4 Bills B advanced to the drive roller 330 by the feeding wheels 302 are held against the central portions 334 of the main drive roller 330 by the idle roller 230. As the main drive roller 330 rotates (clockwise as viewed in FIG. 10), each bill is advanced into the nip formed by the drive roller 330 and the grooved retard rollers 233 and 234. In situations where multiple bills are advanced by the feeding wheels, the grooved retard rollers 233, 234 strip the upper bill(s) from the bottom bill which is in contact with the main drive roller 330.

The grooves in the retard rollers 233, 234 are registered with the two pairs of grooves 340, 342 formed in the main drive roller 330 The two pairs of grooves 340–342 extend around the periphery of the main drive roller 330 (e.g., circumferential grooves). The grooves 340, 342 are shallow such that the surface of the drive roller 330 is substantially smooth. In the embodiment of the drive roller 330 illustrated in FIG. 10, the grooves 340, 342 have a depth of approximately 0.010 inch (about 0.025 cm) and a width of approximately 0.150 inch (about 0.381 cm). The drive roller in the depicted embodiment has a diameter of approximately 1.5 inches (about 3.81 cm). Reducing the depth of the grooves 340, 342 has been found to facilitate the bill feeding process. Unreliable feeding can be caused by the tendency for limp currency bills to be forced into conformity with deeper grooves which can cause bills to become jammed while stiff currency bills may not have full contact with the bottom of deeper grooves which can cause bill slippage resulting in the piling-up of bills. Either of these situations can result in multiple bills being fed or insufficient distance between bills, each of which can cause feeding errors.

The main drive roller 330 includes a pair of inserts 344 and 346 made of out a high friction material such as rubber. The inserts 344, 346 differ from those of the prior art arrangement illustrated in FIG. 4 in that the inserts 344, 346 of the present invention are substantially smooth (e.g., not serrated), but do contain circumferential grooves that correspond to the grooves 340, 342 disposed in the main drive roller 330 and mate with the retard rollers 233, 234. The inserts 344, 346 engage each bill after is it fed into engagement with the main drive rollers by the feeding wheels 302, to frictionally advance each bill into the narrow acute passageway formed by the cured guideway 211 adjacent the rear side of the drive main drive roller 330. Set screws (not shown) are used to mount the inserts 344, 346 to the main drive roller 330.

To further guard against the simultaneous removal of multiple bills from the stack in the input receptacle 12, particularly when small stacks of bills are loaded into the machine 10, the feeding wheels 302 are always stopped with the radially floating inserts 308 positioned below the bottom wall 205 of the input receptacle 12. This is accomplished by continuously monitoring the angular position of the radially floating inserts 308 of the feeding wheels 220 via the encoder 32, and then controlling the stopping time of the drive motor so that the motor always stops the feeding wheels 302 in a position where the radially floating inserts 308 are located beneath the bottom wall 205 of the input receptacle 12. Thus, each time a new stack of bills is loaded into the machine 10, those bills will rest on the smooth portions of the feeding wheels 302. This has been found to aid in the reduction of simultaneously feeding of double or triple bills, particularly when small stacks of bills are involved.

While the invention is susceptible to various modifications and alternative forms, specific embodiments thereof have been shown by way of example in the drawings and herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A currency handling device for rapidly processing a stack of currency bills, the device comprising:

an input receptacle adapted to receive a stack of bills to be processed;

at least one feeding wheel adapted to strip bills, one at a time, from the stack of bills, the at least one feeding wheel including a moveable insert having a surface adapted to engage and to advance each bill, the moveable insert being adapted to move between a first position wherein the surface of the insert extends beyond a periphery of the feeding wheel a first distance and a second position wherein the surface of the insert extends beyond the periphery of the feeding wheel a second distance; and a transport mechanism adapted to receive individual bills advanced by the at least one feeding wheel and to transport each of the bills past an evaluation unit to an output receptacle, the evaluation unit being adapted to determine information concerning each of the bills.

2. The currency handling device of claim 1 wherein the at least one feeding wheel is disposed below the input receptacle and is adapted to strip bills from the bottom of the stack of currency bills.

3. The currency handling device of claim 1 wherein the at least one feeding wheel is adapted to strip one bill from the stack of bills for each revolution of the feeding wheel, the rotation of the at least one feeding wheel being adapted to cause the moveable insert to move toward the first position and to bring the surface of the moveable insert into contact with the bottom bill in the stack of bills, the moveable insert being adapted to move radially inward towards the second position when the surface is brought into contact with the bottom bill in the stack of bills.

4. The currency handling device of claim 1 wherein the surface of the moveable insert is serrated.

5. The currency handling device of claim 1 wherein the surface of the moveable insert is a high friction insert.

6. The currency handling device of claim 1 wherein the transport mechanism includes a main feed roller adapted to receive each of the bills from the at least one feeding wheel.

7. The currency handling device of claim 1 wherein the at least one feeding wheel includes a first feeding wheel having a moveable insert and a second feeding wheel having a moveable insert, and wherein the first and second feeding wheels are coupled to a common drive shaft.

8. The currency handling device of claim 1 wherein the at least one feeding wheel further includes a slot extending radially inward from a periphery of the at least one feeding wheel, the at least one feeding wheel including a post coupled to the base of the slot, wherein the moveable insert is slidably coupled to the post.

9. A document feeding apparatus for use with a document processing device, the apparatus comprising:

an input receptacle adapted to receive a stack of documents; and at least one feeding wheel adapted to strip documents, one at a time, from the stack of documents, the feeding wheel including a moveable insert having a high friction surface adapted to engage and to advance each of the documents.

10. The apparatus of claim 9 wherein the at least one feeding wheel further includes a slot extending radially inward from a periphery of the at least one feeding wheel, the at least one feeding wheel including a post coupled to a base of the slot, wherein the moveable insert is slidably coupled to the post.

11. The apparatus of claim 10 wherein the moveable insert is adapted to slide freely along the post.

12. The apparatus of claim 11 wherein the moveable insert is adapted to slide between a first position wherein the high friction surface of the insert extends beyond a periphery of the feeding wheel a first distance and a second position wherein the high friction surface of the insert is extends beyond a periphery of the feeding wheel a second distance.

13. The apparatus of claim 12 wherein the first distance is between about 0.02 inch and about 0.20 inch.

14. The apparatus of claim 13 wherein the first distance is about 0.040 inch.

15. The apparatus of claim 12 wherein the distance second distance is between about zero inches and about 0.050 inch.

16. The apparatus of claim 15 wherein the second distance is about zero inches.

17. The apparatus of claim 9 wherein the at least one feeding wheel is disposed below the input receptacle and is adapted to strip documents from the bottom of the stack of documents.

18. The apparatus of claim 9 wherein the at least one feeding wheel is adapted to strip one document from the stack of documents for each revolution of the feeding wheel, the rotation of the wheel adapted to cause the moveable insert to slide toward the first position and to bring the high friction surface into contact with the bottom document in the stack of documents, the moveable insert being adapted to slide a distance radially inward towards the second position when the high friction surface is brought into contact with the bottom document in the stack of documents.

19. The currency handling device of claim 18 wherein the distance the moveable insert moves radially inward towards the second position is at least partially dependent on the number of documents remaining in the stack of documents.

20. The currency handling device of claim 18 wherein the distance the moveable insert moves radially inward towards the second position is at least partially dependent on the rotational speed of the at least one feeding wheel.

21. The currency handling device of claim 9 wherein the high friction surface of the moveable insert is serrated.

22. The currency handling device of claim 9 wherein the high friction surface is made of rubber.

23. The currency handling device of claim 9 wherein the at least one feeding wheel includes a first feeding wheel having a moveable insert and a second feeding wheel having a moveable insert, and wherein the first and second feeding wheels are coupled to a common drive shaft.

24. A method of processing currency bills with a currency processing machine, the method comprising:

receiving a stack of bill in an input receptacle;

separating individual bills from the stack of bills with at least one feeding wheel, the at least one feeding wheel including a moveable insert having a high friction surface adapted to grip each bill, the moveable insert being adapted to move between a first position wherein the high friction surface of the insert extends beyond a periphery of the feeding wheel a first distance and a second position wherein the high friction surface of the insert extends beyond the periphery of the feeding wheel a second distance; and transporting each of the separated bills from the at least one feeding wheels past an evaluation unit to at least one output receptacle.

25. The method of claim 24 wherein separating further comprises separating individual bills from the bottom of the stack of bills.

26. The method of claim 24 wherein separating further comprises separating one bill from the stack of bills per revolution of the at least one feeding wheel, wherein the rotation of the wheel is adapted to cause the moveable insert to move toward the first position and to bring the high friction surface into contact with a bottom bill in the stack of bills, the moveable insert being adapted to move radially inward towards the second position when the high friction surface is brought into contact with the bottom bill in the stack of bills.

27. The method of claim 24 wherein the high friction surface of the moveable insert is serrated.

28. The method of claim 24 wherein transporting further comprises a main drive roller adapted to receive each of the bills from the at least one feeding wheel and to advance each of the bills.

29. The method of claim 24 wherein separating further comprises separating individual bills from the stack of bills with a first feeding wheel having a moveable insert and a second feeding wheel having a moveable insert, and wherein feeding further comprises rotating the first and second feeding wheels with a common drive shaft.

30. The method of claim 24 wherein the at least one feeding wheel further includes a slot extending radially inward from a periphery of the at least one feeding wheel, the at least one feeding wheel including a post coupled to the base of the slot, wherein the moveable insert is slidably coupled to the post.

31. A feed wheel for use in a document handling device, the feed wheel comprising:

a cylindrical shaped body having a periphery;

a slot disposed within the body, the slot extending radially inward from the periphery of the body; and a moveable insert having a document engaging surface, the moveable insert being adapted to move along the slot between a first position wherein the document engaging surface extends beyond the periphery of the body a first distance and a second position wherein the document engaging surface extends beyond the periphery of the body a second distance.

32. The feed wheel of claim 31 wherein the document engaging surface is a high friction surface.

33. The feed wheel of claim 31 wherein document engaging surface is serrated.

34. The feed wheel of claim 31 further comprising a post coupled to a base of the slot extending radially outwards towards the periphery of the body, wherein the moveable insert is slidably coupled to the post.

35. The apparatus of claim 34 wherein the moveable insert is adapted to slide freely along the post.

36. The feed wheel of claim 31 further comprising a resilient member disposed between the moveable insert and a base of the slot, the resilient member being adapted to bias the moveable insert radially outward relative to the feed wheel.

37. The feed wheel of claim 36 wherein the resilient member further comprises a spring.

38. The apparatus of claim 31 wherein the first distance is between about 0.02 inch and about 0.20 inch.

39. The apparatus of claim 38 wherein the first distance is about 0.040 inch.

40. The apparatus of claim 31 wherein the distance second distance is between zero inches and about 0.050 inch.

41. The apparatus of claim 40 wherein the second distance is about zero inches.

42. A drive roller arrangement for use in a document handling system comprising:

a drive shaft;

a roller portion disposed about the drive shaft, the roller portion being generally cylindrical in shape; and at least one insert coupled to the main roller portion;

wherein the drive shaft and main roller portion are made from a single piece of material.

43. The drive roller arrangement of claim 42 wherein the insert has a document engaging surface that is raised above the an outer surface of the roller portion.

44. The drive roller arrangement of claim 42 wherein the at least one insert comprises two inserts.

45. The drive roller arrangement of claim 42 wherein the at least one insert has a high friction surface.

46. The drive roller arrangement of claim 42 wherein the at least one insert has a substantially smooth surface.

47. The drive roller arrangement of claim 42 wherein the roller portion has a plurality of shallow grooves disposed therein, the plurality of shallow grooves being registered with at least one retard roller of the document handling system.

48. The drive roller arrangement of claim 42 wherein the single piece of material is aluminum.

* * * * *